(12) United States Patent
Kairali et al.

(10) Patent No.: US 11,776,404 B2
(45) Date of Patent: Oct. 3, 2023

(54) AD-HOC NETWORK OPTIMIZATION BY PARKING ALLOCATION

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/650,088

(22) Filed: Feb. 7, 2022

(65) Prior Publication Data
US 2023/0252898 A1    Aug. 10, 2023

(51) Int. Cl.
*G08G 1/14*    (2006.01)

(52) U.S. Cl.
CPC .......... *G08G 1/148* (2013.01); *G08G 1/142* (2013.01); *G08G 1/146* (2013.01)

(58) Field of Classification Search
None
See application file for complete search history.

(56) References Cited

U.S. PATENT DOCUMENTS

| | | | |
|---|---|---|---|
| 11,455,887 B1* | 9/2022 | Chen | G08G 1/144 |
| 2018/0211534 A1* | 7/2018 | de Moura | G06Q 50/30 |
| 2019/0063947 A1* | 2/2019 | Beaurepaire | G01C 21/3423 |
| 2022/0027747 A1* | 1/2022 | Olsen | G06N 20/00 |

FOREIGN PATENT DOCUMENTS

| | | |
|---|---|---|
| CN | 112562409 A | 3/2021 |
| WO | 2021114261 A1 | 6/2021 |

OTHER PUBLICATIONS

Author Unknown, "Edge Computing," Cleverciti (Blog), Accessed Sep. 16, 2021, https://www.cleverciti.com/en/resources/blog/tag/edge+computing, 25 pages.
Author Unknown, "What are Edge Computing Devices?," EXORINT (Blog), Jun. 21, 2020, https://www.exorint.com/en/blog/what-are-edge-computing-devices, 6 pages.
Belkhala et al., "Smart Parking Architecture based on Multi Agent System," (IJACSA) International Journal of Advanced Computer Science and Applications, vol. 10, No. 3, 2019, pp. 378-382.

(Continued)

*Primary Examiner* — John F Mortell
(74) *Attorney, Agent, or Firm* — Daniel J. Hakimi

(57) ABSTRACT

According to one embodiment, a method, computer system, and computer program product for parking allocation is provided. The embodiment may include measuring a plurality of network optimization factors corresponding to a given area. The embodiment may also include mapping a plurality of priority factors for network optimization across the given area. The embodiment may further include identifying one or more mobile nodes within the given area. The embodiment may also include selecting a location for each mobile node based on one or more priority factors. The embodiment may further include transmitting an instruction directing the mobile node to the location.

20 Claims, 6 Drawing Sheets

(56) References Cited

OTHER PUBLICATIONS

Bura et al., "An Edge Based Smart Parking Solution Using Camera Networks and Deep Learning," 2018 IEEE International Conference on Cognitive Computing, IEEE Computer Society, pp. 17-24.

Huang et al., "Parked Vehicle Edge Computing: Exploiting Opportunistic Resources for Distributed Mobile Applications," IEEE Access, vol. 6, Published Nov. 5, 2018, pp. 66649-66663.

Ma et al., "Parking Edge Computing: Parked-Vehicle-Assisted Task Offloading for Urban VANETs," IEEE Internet of Things Journal, vol. XX, No. XX, Sep. 2020, 15 pages.

Mell et al., "The NIST Definition of Cloud Computing", National Institute of Standards and Technology, Special Publication 800-145, Sep. 2011, 7 pages.

Sarker et al., "Smart Parking System with Dynamic Pricing, Edge-Cloud Computing and LoRa," Sensors 2020, 20, 4669; doi: 10.3390/s20174669, published Aug. 19, 2020, 22 pages.

Wikipedia, "Fog computing," Wikipedia—The Free Encyclopedia, Accessed: Feb. 7, 2022, https://en.wikipedia.org/wiki/Fog_computing, 6 pages.

\* cited by examiner

AD-HOC NETWORK OPTIMIZATION BY PARKING ALLOCATION

BACKGROUND

The present invention relates generally to the field of computing, and more particularly to edge computing.

Edge computing is a distributed computing and networking paradigm where computing is done on nearby devices as opposed to centralized servers or cloud computing. Edge computing may be faster or more efficient than reliance on centralized servers, may carry security or privacy benefits, and may enable new networking paradigms that do not require internet-connected devices, or may improve efficiency of a local network. Edge computing can be used in the context of the Internet of Things (IoT) to take advantage of the computing power of a variety of local computing devices, including not only computers, servers, and mobile phones, but also appliances, vehicles, and other IoT devices. These devices may also assist in network functionality, as may be the case in a mesh wireless network.

SUMMARY

According to one embodiment, a method, computer system, and computer program product for parking allocation is provided. The embodiment may include measuring a plurality of network optimization factors corresponding to a given area. The embodiment may also include mapping a plurality of priority factors for network optimization across the given area. The embodiment may further include identifying one or more mobile nodes within the given area. The embodiment may also include selecting a location for each mobile node based on one or more priority factors. The embodiment may further include transmitting an instruction directing the mobile node to the location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
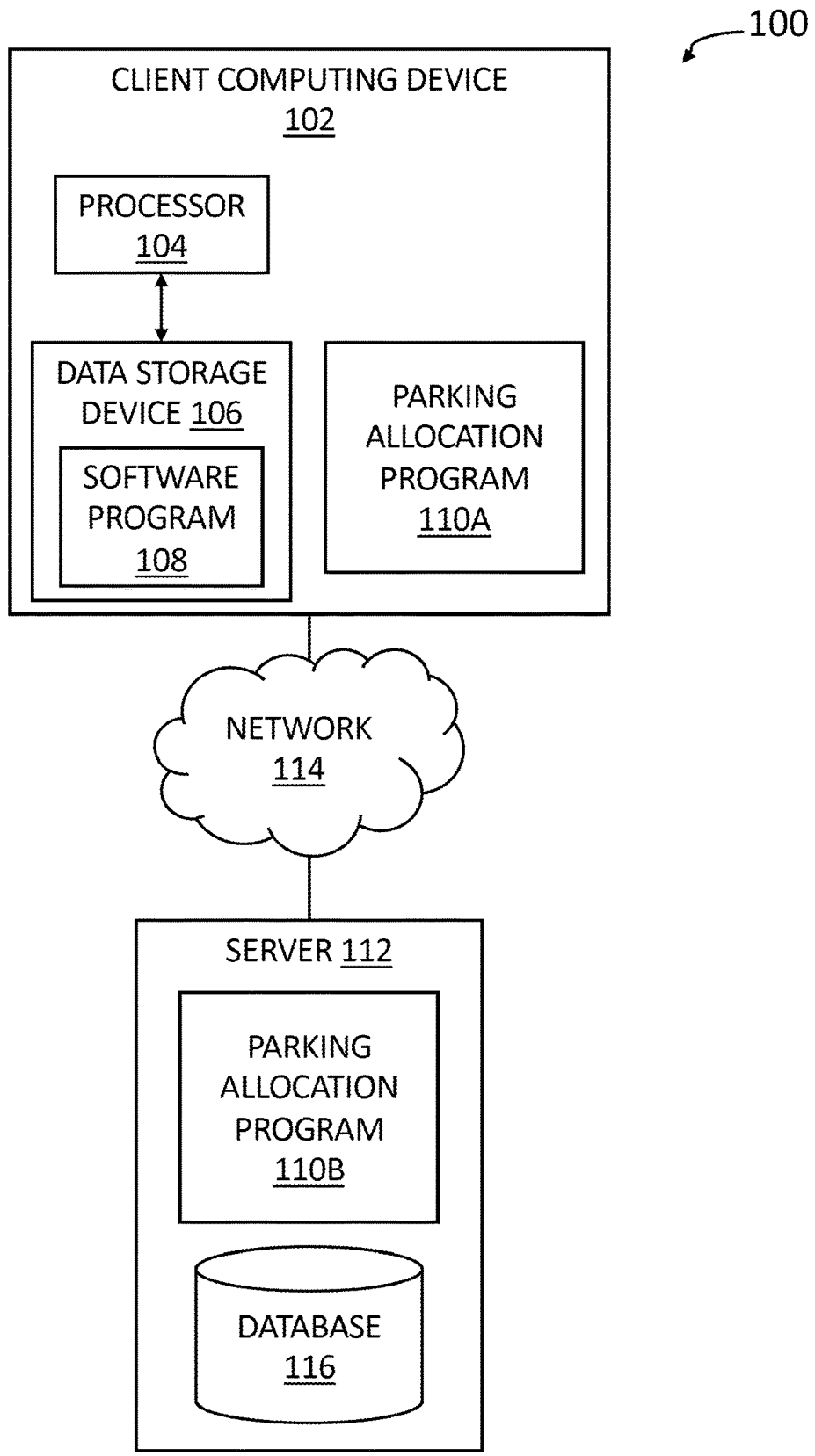
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to edge computing. The following described exemplary embodiments provide a system, method, and program product to, among other things, optimize a network based on ad-hoc analysis of the needs of the network and parking availability. Therefore, the present embodiment has the capacity to improve the technical field of edge computing by allowing networks to take advantage of resources that would otherwise lay idle.

As previously described, edge computing is a distributed computing and networking paradigm where computing is done on nearby devices as opposed to centralized servers or cloud computing. Edge computing can be used in the context of the Internet of Things (IoT) to take advantage of the computing power of a variety of local computing devices, including not only computers, servers, and mobile phones, but also appliances, vehicles, and other IoT devices.

As the IoT advances, a wide variety of devices have increasing computing power. It may be advantageous to utilize these capabilities as part of an edge computing or mesh wireless network. Vehicles, in particular, may have high computing power, storage, or useful networking features, such as a mobile network connection or outbound WiFi functionality. However, such vehicles are often parked out of range of existing wireless networks, or in positions that are otherwise suboptimal for their participation in networking and edge computing.

Specifically, current networks allow vehicles to park in arbitrary or suboptimal positions with no guidance or direction. This may result in vehicles placed outside of the network, or in positions that are obstructed. It may also result in more powerful computing resources being placed far from the devices with which they need to communicate, reducing the effective speed of such communication. As such, it may be advantageous to, among other things, utilize data about the network, parking space, and vehicles in order to select and direct vehicles to optimal parking positions, improving network function.

According to at least one embodiment, vehicles may be directed to different parking spaces to optimize the network's edge computing capacity. For example, computing resources may be identified as being needed at one end of a parking lot and vehicles with more powerful processors may be directed towards that end of the parking lot. Alternatively, it may note that another part of the parking lot needs assistance with ram-intensive tasks and may direct resources towards that section of the parking lot.

Furthermore, vehicles may be directed to different parking spaces to optimize network coverage and speed. For example, if two edges of a parking lot are effectively covered by two different WiFi networks, new vehicles may be directed to cover more central spaces to connect the two networks to one another. Alternatively, if a building resident's apartment is near a parking space, and WiFi coverage in that area is weak, a new vehicle may be directed to cover that apartment with outbound WiFi signals. The vehicle may receive inbound signals via WiFi or a dedicated 5G connection.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for ad-hoc optimization of a network by parking allocation.

Referring to FIG. 1, an exemplary networked computer environment 100 is depicted, according to at least one embodiment. The networked computer environment 100 may include client computing device 102, and a server 112, interconnected via a communication network 114. According to at least one implementation, the networked computer environment 100 may include a plurality of client computing devices 102, and servers 112, of which only one of each is shown for illustrative brevity. Additionally, in one or more embodiments, the client computing device 102 and server 112 may each individually host a parking allocation program 110A, 110B. In one or more other embodiments, the parking allocation program 110A, 110B may be partially hosted on both client computing device 102 and server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a parking allocation program 110A and communicate with the server 112 via the communication network 114, in accordance with one embodiment of the invention. In one or more other embodiments, client computing device 102 may be, for example, a mobile device, a telephone, a personal digital assistant, a vehicle (for example, a car, a motorcycle, a scooter, or a truck), a netbook, a laptop computer, a tablet computer, a desktop computer, a parking kiosk, a digital signage device, or any type of computing device capable of running a program and accessing a network. As previously described, one client computing device 102 is depicted in FIG. 1 for illustrative purposes, however, any number of client computing devices 102 may be utilized. As will be discussed with reference to FIG. 4, the client computing device 102 may include internal components 402a and external components 404a, respectively.

The server computer 112 may be a laptop computer, netbook computer, personal computer (PC), a desktop computer, a vehicle, a parking kiosk, or any programmable electronic device or any network of programmable electronic devices capable of hosting and running a parking allocation program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the parking allocation program 110A, 110B may be capable of analyzing network optimization factors, such as connectivity and edge computing availability, in a given area, for example a parking lot. Accordingly, the parking allocation program 110A, 110B may direct vehicles to optimal locations to improve network function according to the various network optimization factors. The parking allocation program 110A, 110B may further map network priority across the area based on network optimization needs. The parking allocation program 110A, 110B may further identify mobile nodes, for example vehicles, in the area to determine their computing capabilities and other factors that may help position them in furtherance of the network optimization criteria. The parking allocation program 110A, 110B may further select optimal locations for the various nodes based on the various optimization criteria. The parking allocation program 110A, 110B may further direct mobile nodes to the optimal locations, such as by providing a parking space number to a driver or issuing coordinates to a self-driving vehicle and instructing it to drive to those coordinates. The parking allocation method is explained in further detail below with respect to FIG. 2.

Figure 2:
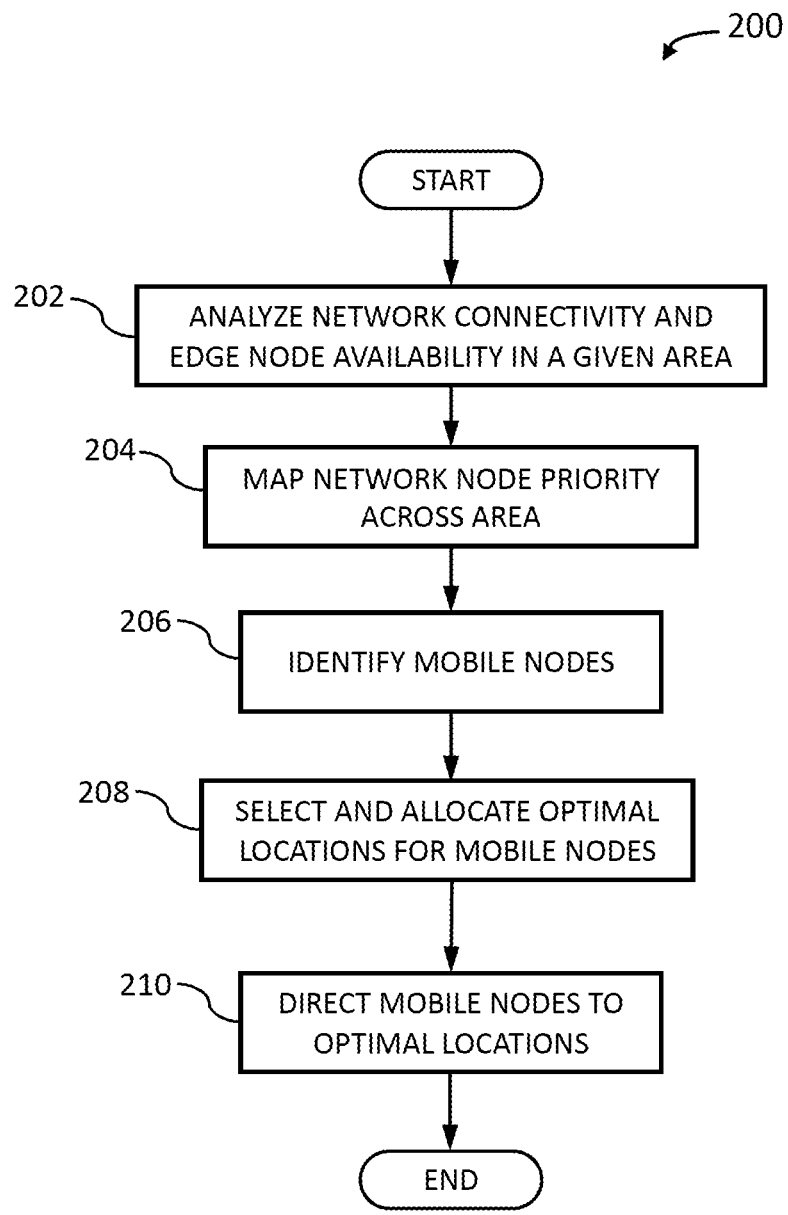
FIG. 2 illustrates an operational flowchart for a process for ad-hoc network optimization by parking allocation according to at least one embodiment.

Referring now to FIG. 2, an operational flowchart illustrating a process for parking allocation 200 is depicted according to at least one embodiment. At 202, the parking allocation program 110A, 110B analyzes a network for network optimization factors within a preconfigured area. Network optimization factors may include network connectivity, network coverage, or availability of edge node within the network. Network connectivity may be a measurement of average speed or signal strength across the preconfigured area, or speed in a particular area, whereas network coverage may be a measurement of the portion of the area that is covered by some minimum threshold of internet signal strength. In at least one embodiment, the preconfigured area may be a parking lot or parking structure. In another embodiment, the preconfigured area may include one or more adjacent areas, such as a store, shopping center, park, home, or office building. A preconfigured area may include multiple distinct parking areas.

In at least one embodiment, the network optimization factors may include a measure of need for redundancy. For example, the parking allocation program 110A, 110B may measure network coverage in the area as though the most useful single vehicle were missing, thereby securing the network against the risk that central vehicles leave at inopportune times. Network optimization factors may also include historical information regarding network performance.

Then, at 204, the parking allocation program 110A, 110B maps network priority across the given area. The parking allocation program 110A, 110B may map a single priority factor, multiple priority factors, or a single combined weighted measurement of multiple priority factors. Priority on the map may be measured in a variety of ways. For example, priority may be measured by a classification into discrete levels of priority. These discrete levels of priority may include, for example, a binary measure signifying whether that particular location is covered by the network. In an alternate example, priority on the map may be measured by a fluid measurement such as a rational number. For example, priority may include a numerical grading of edge computing need in light of network optimization factors.

In at least one embodiment, the map may include information about the area, such as parking spaces, walls, pillars, locations of fixed servers, entrance and exit locations, locations of kiosks, designation of usable parking space, and weight capacity of upper floors. In at least one embodiment, this mapping may be a simple two- or three-dimensional spatial map. In at least one embodiment, the vertical dimension may be measured in discrete floors. In at least one embodiment, the horizontal dimensions may be represented by a simple grid system. In at least one other embodiment, the map distances may not measure space, but weighted space-related measurements that factor in obstructions such as walls.

In at least one embodiment, the map may include information about neighboring areas, roads, and sidewalks. For example, the map may include the locations of the entrances and exits of nearby buildings.

Priority may also be measured at a variety of different time and space intervals. The time intervals may be frequent, on a scale of small fractions of a second, to simulate continuous updating. Alternatively, priority may only be measured at certain times. For example, priority may be measured only once per hour, or once per minute only during business hours, or once at 9:00 AM, 12:00 PM, 1:00 PM, and 5:00 PM on weekdays. Alternatively, the time interval may be set in response to external events. For example, priority may be measured whenever a vehicle enters a parking area or accesses a parking kiosk. The space intervals may be continuous across the entire map, as may be represented by rational number distances. Alternatively, measurements may fit a discrete grid system. For example, a grid system may be drawn to correlate to parking spaces, and priority may be measured at each parking space. Alternatively, priority may be measured at specific key points, such as an entryway, the south side of a wall known to obstruct wireless signals, or a point known to be useful in supporting a nearby main area.

Then, at 206, the parking allocation program 110A, 110B identifies and analyzes mobile nodes, such as vehicles, within the given area. In at least one embodiment, mobile nodes may include a variety of vehicles, including cars, trucks, scooters, motorcycles, busses, boats, helicopters, and airplanes. In at least one embodiment, mobile nodes may further include other devices, such as tablets and mobile phones, which may move within the parking area. Identifying a mobile node may include identifying what type of device it is, what networking features it has, the nature of its inbound connections, the range and nature of its outbound connections, its processor speed, its storage capacity, its physical size and shape, or its current battery level.

In at least one embodiment, the parking allocation program 110A, 110B may predict likely parking duration of a mobile node. This prediction may be done generally, by categorizing vehicles and approximating average park times in each category. For example, the parking allocation program 110A, 110B may note that scooters park for a shorter time than vehicles. Alternatively, the prediction may be done by analyzing historical data about mobile nodes. For example, the parking allocation program 110A, 110B may note that vehicles with low battery power are likely to park for a longer time than vehicles with high battery power.

In a further embodiment, the parking allocation program 110A, 110B may prompt a vehicle, driver or passenger for additional input. For example, the parking allocation program 110A, 110B may ask a driver where that driver is going after parking is complete. Alternatively, if the parking allocation program 110A, 110B believes that a vehicle is an emergency vehicle, it may prompt the vehicle for an emergency vehicle confirmation code.

Additionally, the parking allocation program 110A, 110B may identify and analyze the capabilities of other devices. In particular, the parking allocation program 110A, 110B may identify devices that are frequently present in the networked area, such as servers, networking devices, parking kiosks, desktop and laptop computers, and point of sale devices.

Then, at 208, the parking allocation program 110A, 110B selects and allocates an optimal parking location for a mobile node in light of network optimization factors or priority. The optimal parking location may be determined by maximizing one of the network optimization factors, or by maximizing a single priority factor, or by maximizing a weighted priority score. For example, if network coverage priority and edge computing priority are each scored on a 100 point scale, and network coverage is weighed at double the value of edge computing availability, the parking allocation program 110A, 110B may map two points in an area as follows: one point with a network coverage priority score of 13 and an edge computing priority score of 87 would have a combined weighted score of 113, and a second point with a network coverage priority score of 44 and an edge computing priority score of 40 would have a combined weighted score of 128. In such a case, between the two, the latter point on the map would be of greater priority.

In at least one embodiment, the optimal parking location may be set to meet certain conditions. For example, if an electric vehicle has low battery power, the parking allocation program 110A, 110B may recognize a condition that the vehicle must be placed near a charging station or outlet.

In at least one embodiment, the optimal parking location may be a traditional parking space delineated by parking lines. Such parking lines may lead up to a wall or curb, such that two lines and the wall or curb denote a parking space, or may cross through other lines, so that three line segments denote a parking space. These lines may be perpendicular to each other, or to a wall, or may be angled on a bias to allow for diagonal parking. These lines may be placed a car's width apart, and may be as long as a car, to suggest cars may park parallel to one another, or may be a car's length apart, to suggest cars may park parallel to a wall or curb. In an additional embodiment, there may be small stoppers placed near one end of a parking space to indicate the end of a parking space or to prevent vehicles from passing the end of a parking space.

Alternatively, the optimal parking location may be any location in the parking area sufficiently large to accommodate a vehicle. In a further embodiment, this may be modeled on a map by a coordinate grid system. In an alternate embodiment, the parking area may be modeled as continuous space with fractional measurements. For example, a car may be directed to park with its front left wheel at a point 34.7680 feet north of a south wall, and 19.2400 feet east of a west wall, at an angle 0.38 radians west of north.

In at least one embodiment, certain locations in the parking area may be excluded from valid parking areas. The network optimization factors may include flexibility in parking as vehicles enter, exit, and move within the parking area. For example, a narrow segment of the parking area may be weighted negatively so that vehicles can move freely through it, or so that a more powerful vehicle may be parked there in the future.

In at least one embodiment, the parking allocation program 110A, 110B may select the optimal parking location for a particular vehicle in light of the properties of that particular vehicle and the various network optimization factors. For example, if there is a high need for computing power in a particular area, and a vehicle has little computing power, and current traffic in the parking area is high, the parking allocation program 110A, 110B may determine that a space in that particular area is not optimal for the vehicle, since it may be more optimal for other vehicles to park there in the near future. Alternatively, if there is low traffic in the area, the parking allocation program 110A, 110B may determine that a space in that particular area is optimal for the vehicle since it is unlikely to obstruct future vehicles. As an alternate example, the parking allocation program 110A, 110B may determine that the optimal parking location for a scooter is in a narrow section of the parking area where other vehicles may not comfortably fit.

In at least one embodiment, the parking allocation program 110A, 110B may select the optimal parking location for a particular vehicle in light of additional input from the vehicle, such as the location the driver intends to visit, or confirmation that a vehicle is an emergency vehicle. For example, if the driver intends to visit an area west of the parking area, the parking allocation program 110A, 110B may favor parking spaces to the west of the area, e.g. by a weighted factor or rule. Alternatively, if a vehicle is confirmed to be an emergency vehicle, the parking allocation program 110A, 110B may select a space near an exit, or may place greater priority on ensuring that the emergency vehicle is not obstructed from leaving the area going forward.

In at least one embodiment, a need for redundancy may be weighed in light of a predicted likely parking duration. For example, if the parking allocation program 110A, 110B predicts that a given car is likely to stay in the parking area for 30 minutes, it may select optimal parking locations for additional mobile nodes near the given car in order to cover that area after the given car leaves the parking area.

Then, at 210, the parking allocation program 110A, 110B directs a mobile node to the optimal parking location. The parking allocation program 110A, 110B may direct the mobile node by directing a human driver through various methods. For example, the parking allocation program 110A, 110B may print a paper parking pass telling the driver which particular parking space to park in, providing written directions to a particular parking space, recite audio directions to a driver, or display directions to a driver via video display. Alternatively, the parking allocation program 110A, 110B may send a notification to a client computing device 102 directing a user to a particular parking space, either by providing a parking space number, or by displaying a map UI with directions. The parking area 302 may include signage, including traditional signage and digital signage, helping drivers follow directions or find a particular number parking space. In at least one embodiment, these directions may be vague, directing a mobile node to one of multiple parking lots, to one floor of a parking structure, or to a particular color zone within a parking lot.

In an alternate embodiment, the parking allocation program 110A, 110B may direct self-driving vehicles to a particular parking location through various methods. For example, the parking allocation program 110A, 110B may control the vehicle directly and place it in the optimal parking location. Alternatively, the parking allocation program 110A, 110B may message a parking space number or coordinates of a particular parking location to a vehicle and instruct the vehicle's driving algorithm to seek that space and park in it. The parking allocation program 110A, 110B may provide the vehicle with a parking rule which the vehicle's driving algorithm then uses to select a more specific parking location following the rule. For example, a rule may offer a list of parking location options; may describe a circle with a ten foot radius as a valid parking location; or may provide x and y coordinates, but allow the vehicle's driving algorithm to select the floor it wants to park on in a parking structure.

In at least one embodiment, the parking allocation program 110A, 110B may specifically indicate the position in which the mobile node should park. For example, the parking allocation program 110A, 110B may note that a vehicle's networking device is in its rear, and accordingly direct a vehicle to enter a parking space in reverse in order to position the networking device further towards the inside of the parking space.

In a further embodiment, the parking allocation program 110A, 110B may select and allocate a new optimal parking location for a mobile node that is already parked, or for a vehicle that is in transit to the optimal parking location, and redirect the vehicle to the new optimal parking location.

Figure 3:
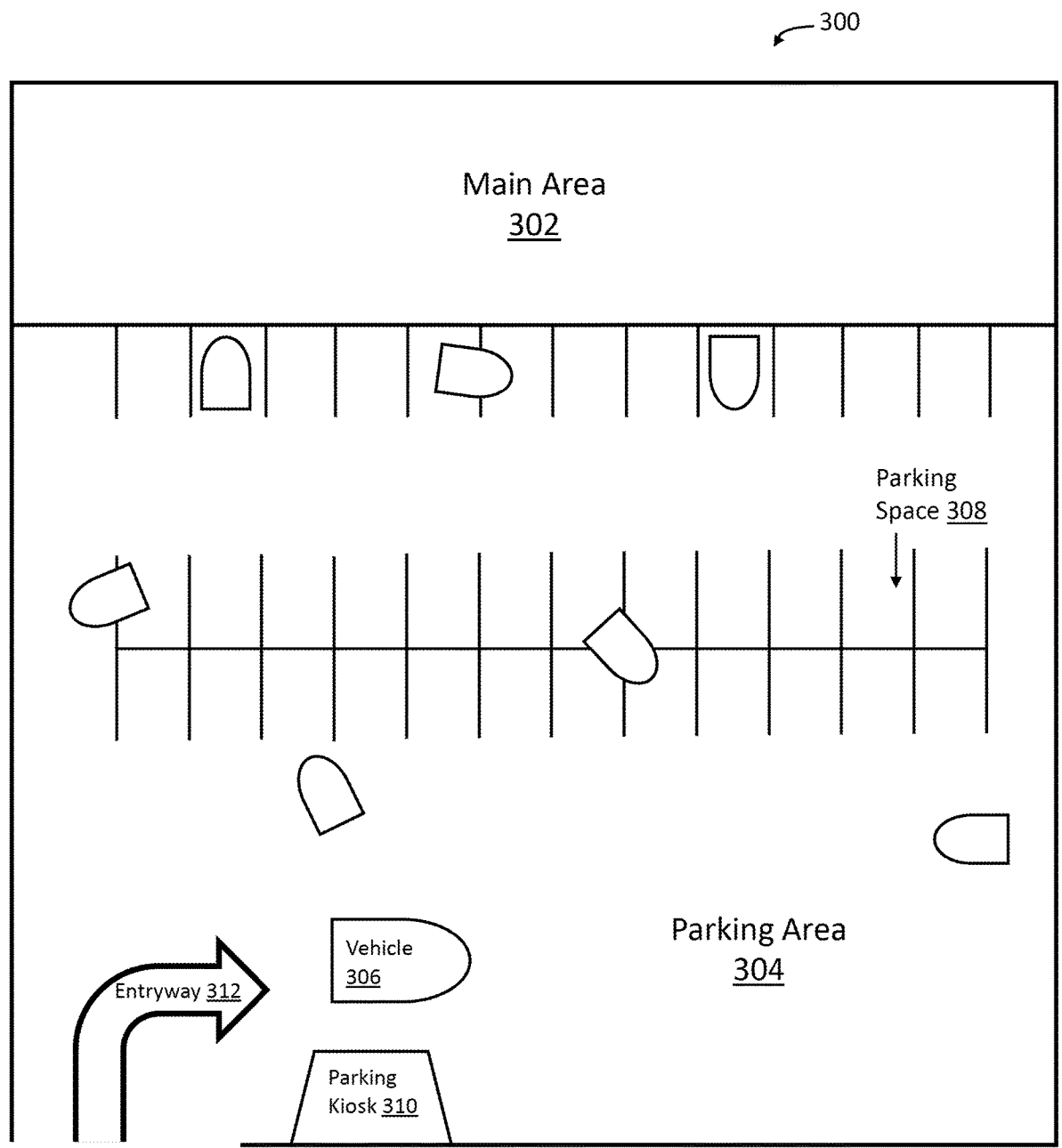
FIG. 3 illustrates a potential parking area and adjacent networked area that are managed by ad-hoc network optimization according to at least one embodiment.

FIG. 3 illustrates a potential networked area 300 that is managed by ad-hoc network optimization according to at least one embodiment. The main area 302 may be one or more areas near the parking area, which may be part of the network 114. Alternatively, the main area 302 may not be part of the network 114, but the parking allocation program 110A, 110B may be charged with extending the network 114 to include the main area 302. For example, the main area may be a shopping center, store, apartment building, home, office building, park, or other public area.

The parking area 304 may be an area where mobile nodes 306 are parked or stored. For example, the parking area 304 may be a parking lot, parking structure, or a bike rack.

In at least one embodiment, a mobile node 306 is a device, e.g., a vehicle, which may need a space to park. In at least one embodiment, a mobile node 306 may also have inbound and outbound networking capabilities, allowing it to contribute to the network 114. A mobile node 306 may contribute in a manner similar to a mesh WiFi node, mobile network extender, or signal repeater. In at least one embodiment, a mobile node 306 may have computing power, which it may then contribute to the network. A mobile node 306 may contribute computing power to the network according to an edge computing model, a cloud computing model, a classic server model, or a distributed computing model.

In at least one embodiment, drawn lines may delineate one or more parking spaces 308. Parking spaces 308 may have printed numerals or other indicators on the floor, a nearby wall, or nearby signage. There may be additional signage across the parking area 302 helping users find particular parking spaces 308. In at least one embodiment, a vehicle may be directed to a delineated parking space 308. In at least one embodiment, vehicles may exclusively be directed to delineated parking spaces 308. In an alternate embodiment, vehicles may be directed to parking locations without regard for parking spaces. For example, self-driving vehicles may be placed over parking lines in positions that are not traditionally legal if the parking allocation program 110A, 110B determines that those positions are optimal.

In at least one embodiment, the parking area 302 may include one or more parking kiosks, such as parking kiosk 310. In at least one embodiment, the parking kiosk may be a client computing device 102 or server 112. In at least one embodiment, the parking kiosk may include a printer used to print tickets for use in parking. The parking allocation program 110A, 110B may require mobile nodes to obtain admittance from the parking kiosk in order to enter the parking area. In at least one embodiment, a user may access a parking kiosk after parking.

The parking area 302 may have at least one entryway 312. In at least one embodiment, there is an exit adjacent to an entryway. In other embodiments, there may be one or more exits elsewhere in the parking area 302. Entryways may each have a corresponding parking kiosk. In an alternate embodiment, a user may need to install the parking allocation program 110A, 110B on a mobile node, smartphone, or other device in order to gain admittance to the parking area 302. In at least one embodiment, an entryway may have a gate or door that helps regulate admittance into the parking area 302 at each entryway.

It may be appreciated that FIG. 2 and FIG. 3 provide only illustrations of one implementation and do not imply any limitations with regard to how different embodiments may be implemented. Many modifications to the depicted environments may be made based on design and implementation requirements.

Figure 4:
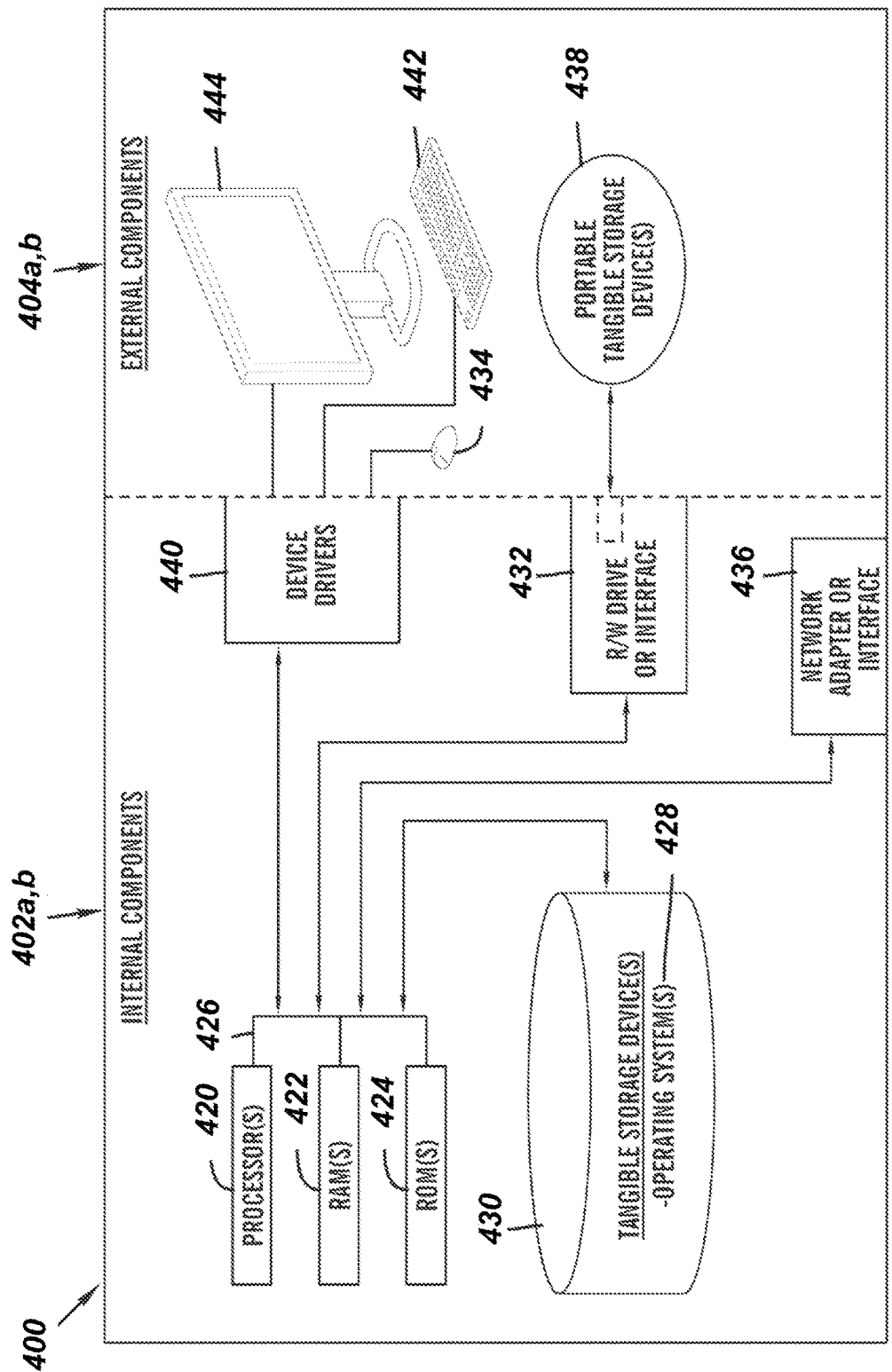
FIG. 4 is a block diagram of internal and external components of computers and servers depicted in FIG. 1 according to at least one embodiment.

FIG. 4 is a block diagram 400 of internal and external components of the client computing device 102, the server 112, and the networking device 120 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102, the server 112, and the networking device 120 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the parking allocation program 110A in the client computing device 102 and the parking allocation program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the parking allocation program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the parking allocation program 110A in the client computing device 102 and the parking allocation program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the parking allocation program 110A in the client computing device 102 and the parking allocation program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
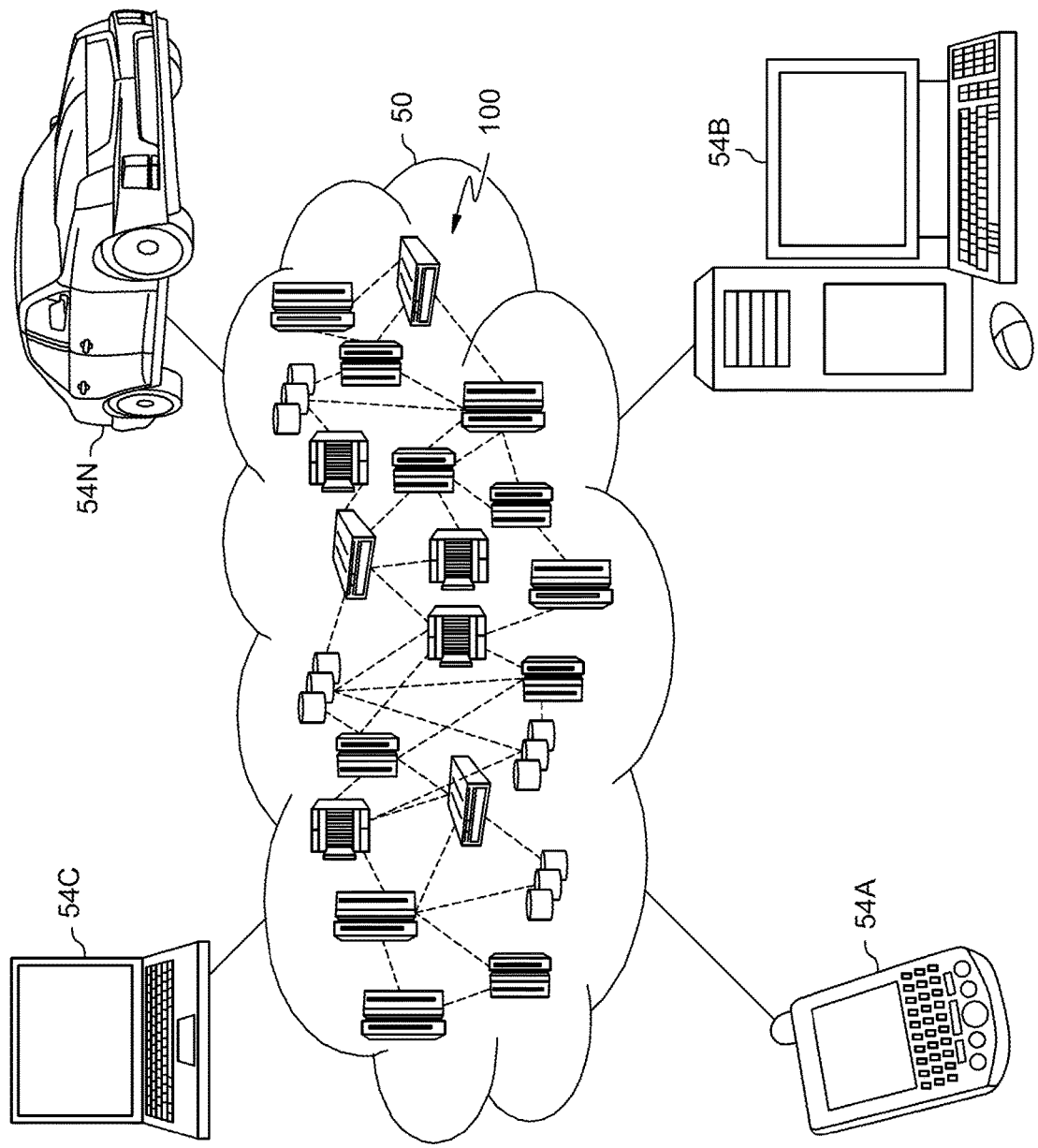
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
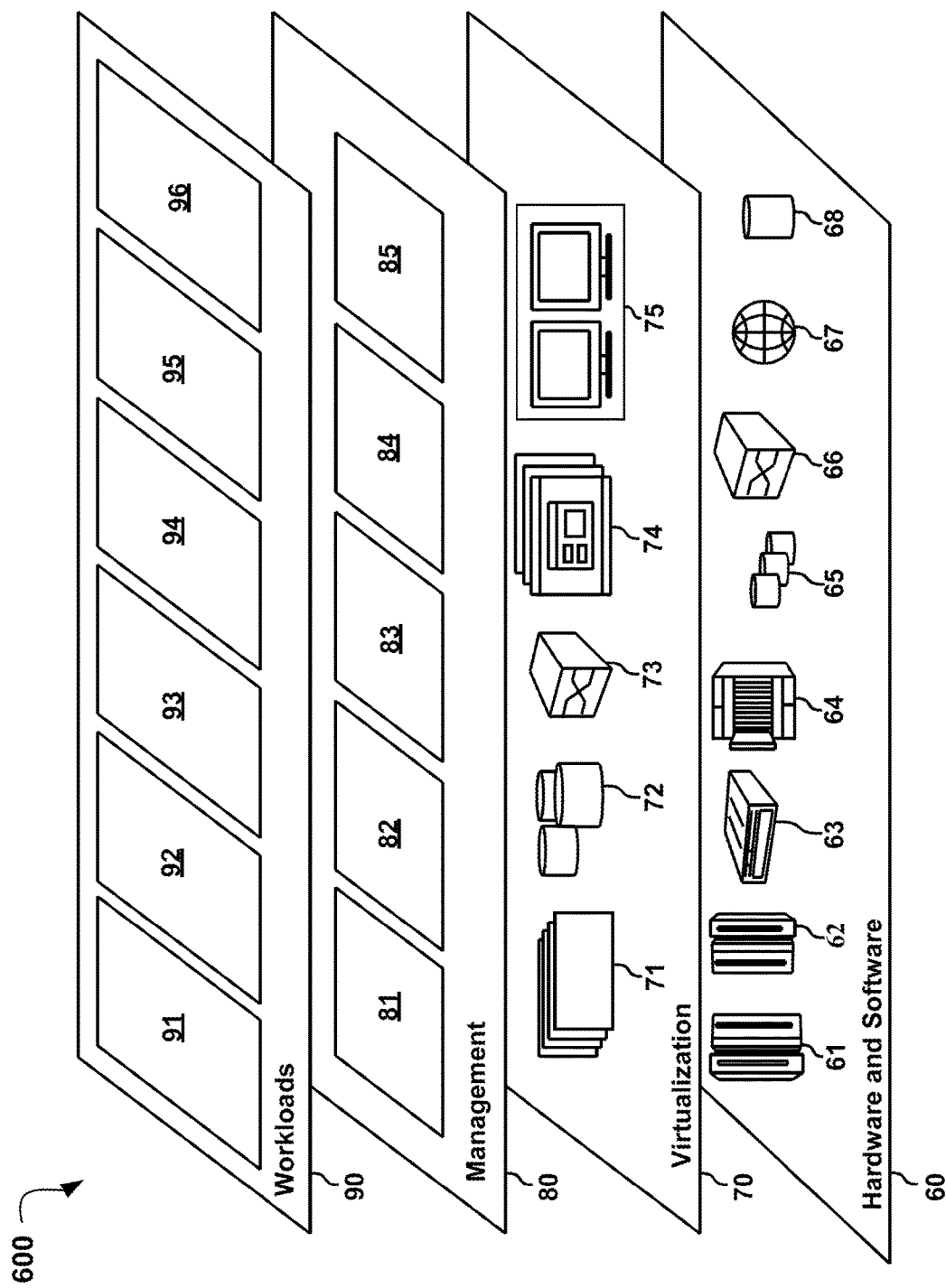
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking allocation 96. Parking allocation 96 may relate to ad-hoc network optimization by parking allocation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   measuring a plurality of network optimization factors wherein the network optimization factors correspond to optimization of a network within a given area;
   mapping a plurality of priority factors for network optimization across the given area based on one or more network optimization factors from the plurality of network optimization factors;
   identifying one or more mobile nodes within the given area;
   selecting a location for each mobile node based on one or more priority factors; and
   transmitting an instruction directing the mobile node to the location.

2. The method of claim 1, wherein the given area comprises a parking lot or a parking structure, and wherein the mobile nodes comprise at least one vehicle.

3. The method of claim 1, wherein the network optimization factors are selected from a group consisting of network connectivity, network coverage, availability of edge computing resources, and need for redundancy.

4. The method of claim 1, wherein the selecting is further based on additional input from a user or a mobile node within the one or more mobile nodes.

5. The method of claim 1, wherein the identifying further comprises:
   identifying static objects in the given area.

6. The method of claim 1, wherein a mobile node within the one or more mobile nodes that has already been directed to a particular location is redirected to a new location.

7. The method of claim 1, wherein the one or more mobile nodes are vehicles with self-driving capabilities.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   measuring a plurality of network optimization factors wherein the network optimization factors correspond to optimization of a network within a given area;
   mapping a plurality of priority factors for network optimization across the given area based on one or more network optimization factors from the plurality of network optimization factors;
   identifying one or more mobile nodes within the given area;
   selecting a location for each mobile node based on one or more priority factors; and
   transmitting an instruction directing the mobile node to the location.

9. The computer system of claim 8, wherein the given area comprises a parking lot or a parking structure, and wherein the mobile nodes comprise at least one vehicle.

10. The computer system of claim 8, wherein the network optimization factors are selected from a group consisting of network connectivity, network coverage, availability of edge computing resources, and need for redundancy.

11. The computer system of claim 8, wherein the selecting is further based on additional input from a user or a mobile node within the one or more mobile nodes.

12. The computer system of claim 8, wherein the identifying further comprises:
   identifying static objects in the given area.

13. The computer system of claim 8, wherein a mobile node within the one or more mobile nodes that has already been directed to a particular location is redirected to a new location.

14. The computer system of claim 8, wherein the one or more mobile nodes are vehicles with self-driving capabilities.

15. A computer program product, the computer program product comprising:
   one or more computer-readable tangible storage medium and program instructions stored on at least one of the one or more tangible storage medium, the program instructions executable by a processor capable of performing a method, the method comprising:
   measuring a plurality of network optimization factors wherein the network optimization factors correspond to optimization of a network within a given area;
   mapping a plurality of priority factors for network optimization across the given area based on one or more network optimization factors from the plurality of network optimization factors;
   identifying one or more mobile nodes within the given area;
   selecting a location for each mobile node based on one or more priority factors; and
   transmitting an instruction directing the mobile node to the location.

16. The computer program product of claim 15, wherein the given area comprises a parking lot or a parking structure, and wherein the mobile nodes comprise at least one vehicle.

17. The computer program product of claim 15, wherein the network optimization factors are selected from a group consisting of network connectivity, network coverage, availability of edge computing resources, and need for redundancy.

18. The computer program product of claim 15, wherein the selecting is further based on additional input from a user or a mobile node within the one or more mobile nodes.

19. The computer program product of claim 15, wherein the identifying further comprises:
   identifying static objects in the given area.

20. The computer program product of claim 15, wherein a mobile node within the one or more mobile nodes that has already been directed to a particular location is redirected to a new location.

\* \* \* \* \*